(Model.)

F. A. WEISE.
Glass Mold.

No. 229,779. Patented July 6, 1880.

WITNESSES:
C. Neveux
C. Sedgwick

INVENTOR:
F. A. Weise
BY Munn & Co
ATTORNEYS.

UNITED STATES PATENT OFFICE.

FREDERIC A. WEISE, OF BROOKLYN, ASSIGNOR TO MICHAEL H. HAGERTY, OF NEW YORK, N. Y.

GLASS-MOLD.

SPECIFICATION forming part of Letters Patent No. 229,779, dated July 6, 1880.

Application filed April 9, 1880. (Model.)

*To all whom it may concern:*

Be it known that I, FREDERIC A. WEISE, of Brooklyn, in the county of Kings and State of New York, have invented a new and useful Improvement in Glass-Molds, of which the following is a specification.

Figure 1:
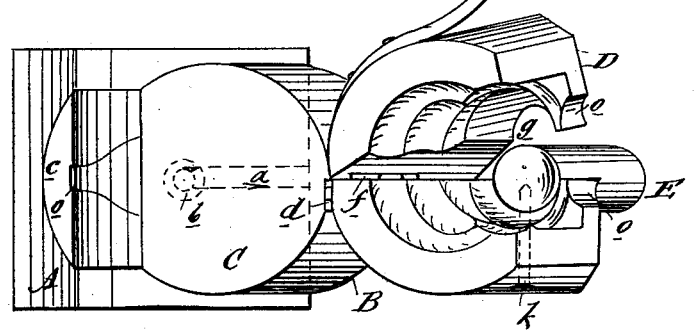
Figure 2:
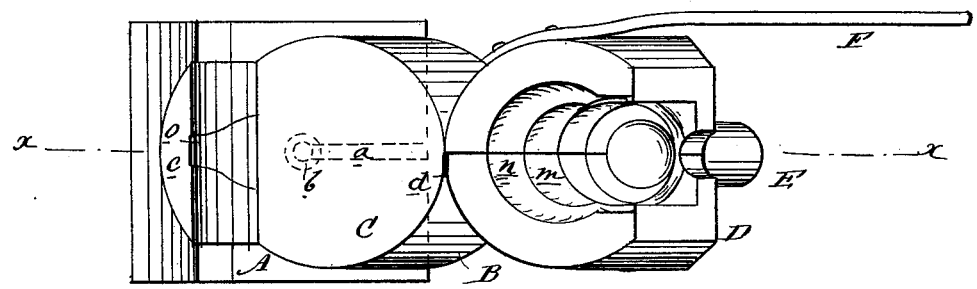
Figure 3:
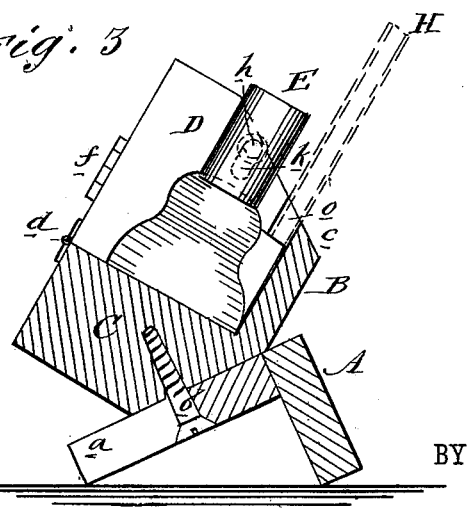

Figure 1 is a top view of the mold opened. Fig. 2 is a top view of the mold partly opened. Fig. 3 is a vertical sectional elevation of the mold closed on line $x\,x$, Fig. 2.

Similar letters of reference indicate corresponding parts.

The object of this invention is to provide a glass-mold designed more especially for making "fountain-bottles" and the like, in which the glass may be more evenly or suitably distributed than in the present style of mold, and from which the bottle may be more easily and quickly removed.

The invention consists in a mold made in three parts, the base of the mold being pivoted to a stand, and the top of the mold being made in two parts that are hinged together, and that are also hinged to the base, so that the said top may be thrown back for the introduction of the melted glass therein of which the bottle or other object is to be formed, and may be thrown back and opened for the removal of said bottle or other object when it is formed; and the invention further consists of a movable plug or plunger made adjustable in a vertical hole in the said top of the mold.

In the drawings, A represents a mold-stand provided with a slot, $a$, in which moves the screw $b$, that holds the mold B to the said stand A, so that the said mold B can be revolved, elevated, and depressed within certain limits at will. C is the bottom or base of the mold, provided with a front upward-projecting lip, $c$. D is the top of the mold, hinged by hinge $d$ to the bottom or base C, as shown, said top being made in two parts hinged together on a vertical line by hinge $f$, as shown, so that said top D can be thrown back from the bottom or base C and be opened into two parts for the removal of the bottle which is formed in the mold. E is the plunger, held movably in the opening $g$ in the top of the mold B by means of the screw $h$, that passes through the slot $k$ in one side of the top D. F is the handle or lever for opening or closing the mold.

Internally the mold is shaped with recesses and projections $m\,n$, according to the shape of the bottle or article to be made.

When used the top D of the mold is thrown back, its two parts being held together, and the melted glass is put therein. The said top is then quickly closed upon the bottom or base C of the mold, against the inner face of the lip $c$, the tube H (shown in dotted lines) inserted into the opening $o$, which is formed partly in the top and partly in the base or bottom of the mold, and the glass then blown to form the bottle or other object. Then the tube H is withdrawn and the top D of the mold is quickly thrown back.

If the bottle or other object is so outlined or shaped that it can be pushed out by the plunger E, pressure is applied to the top of said plunger E for that purpose; but if the bottle is so shaped or outlined that it cannot be so ejected by the plunger E the parts of the top D are thrown apart, so that the bottle may be easily removed.

In Fig. 3 it will be seen from the internal shape of the mold that the bottle or other object formed within it could not be ejected by plunger E, but only by the opening of the two parts of the top D.

Any designs that may be desirable to be impressed upon the top of the bottle may be formed on the bottom of said plunger E.

When the mold is internally shaped so that the article formed therein may be ejected by the plunger E, it is not always desirable to form the top D in two parts.

One advantage of this hinged top is, that the top being thrown back the melted glass can be introduced into it rather than into the bottom of the mold, as is commonly the case; and it results from the melted glass first cooling in the top of the mold, where it is introduced, that the top of the fountain-bottle or other object is made thicker than those produced in ordinary molds, wherein the glass is introduced at the bottom.

Having thus fully described my invention, I claim as new and desire to secure by Letters Patent—

1. A glass-mold constructed substantially as herein shown and described, consisting of a base or bottom, C, to which is hinged with a horizontal hinge the top D, said top D being in two parts hinged together vertically, as set forth.

2. In a glass-mold, the combination, with the base or bottom C, provided with upper projecting lip, c, of the hinged top D, substantially as herein shown and described.

3. The combination, with the adjustable base or bottom C and hinged top D, of the slotted stand A, substantially as herein shown and described.

FREDERIC A. WEISE.

Witnesses:
I. I. STORER,
C. SEDGWICK.